July 8, 1969  R. REBARCHEK  3,453,786
EASILY ERECTABLE GREENHOUSE
Filed Aug. 11, 1967

INVENTOR.
RAYMOND REBARCHEK,
BY
ATTORNEYS.

United States Patent Office 3,453,786
Patented July 8, 1969

3,453,786
EASILY ERECTABLE GREENHOUSE
Raymond Rebarchek, Box 464,
Palmer, Alaska 99645
Filed Aug. 11, 1967, Ser. No. 659,990
Int. Cl. E04b 1/347
U.S. Cl. 52—63                        3 Claims

ABSTRACT OF THE DISCLOSURE

A polygonal frame made up of L-shaped members having thin lower ends secured to a horizontal, polygonal frame and their upper ends secured to a circular disc, said frame being covered with light-penetrable plastic material.

---

This invention relates primarily to greenhouses which may be shipped flat and assembled by unskilled labor into a sturdy, durable building for greenhouse use. The framework of the building is covered with a clear or at least translucent plastic material and, when used as a conventional shelter of the tent type, the framework may be covered with waterproof textile material.

The main object of the invention is to provide a building or greenhouse involving relatively few parts which may be shipped flat and readily assembled.

The above and other objects will be made clear from the following detailed description taken in connection with the annexed drawings, in which.

Figure 1:
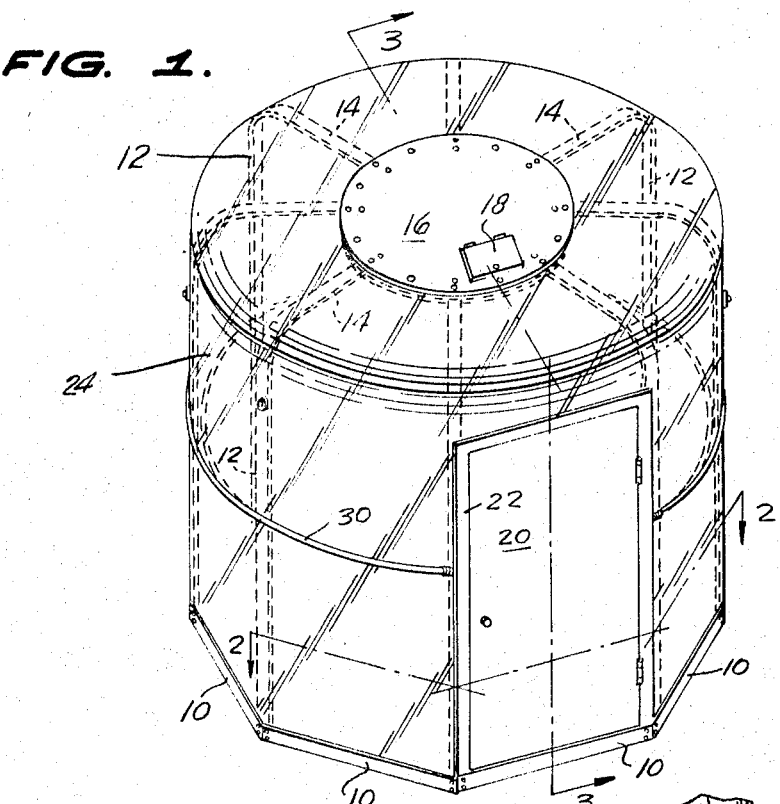
FIGURE 1 is a perspective view of the fully assembled greenhouse.
Figure 2:
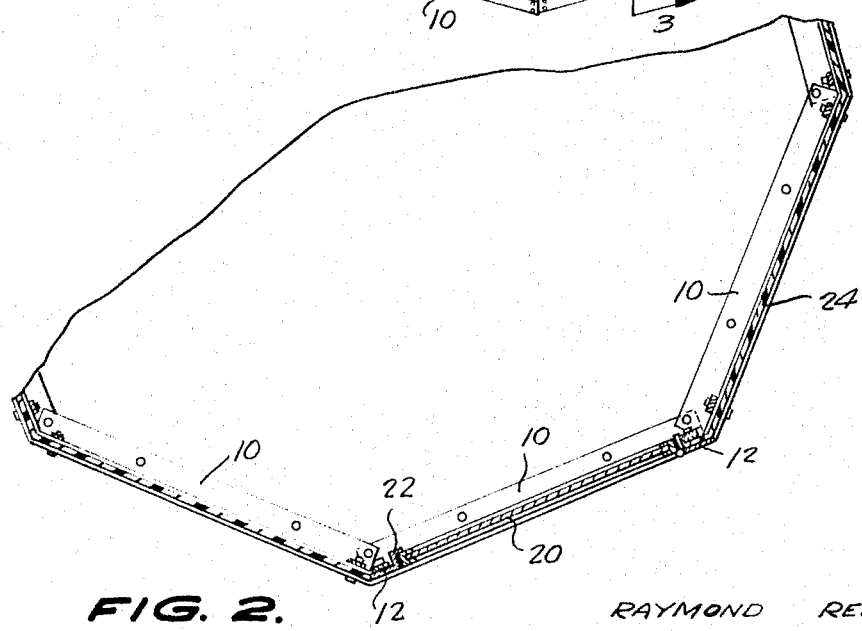
FIGURE 2 is a section on the line 2—2 of FIGURE 1.

FIGURE 1 shows a completed greenhouse made up of base members 10 which are joined by L-shaped uprights 12 having horizontal top portions. The top portions 14 of the vertical members 12 are all joined to a central disc 16 in which is formed an adjustable venting lid 18 and a door 20 is mounted in a door frame 22 which is secured to the vertical portions of a pair of adjacent members 12. The mounting of the door 20 and the frame 22 is best illustrated in FIGURE 2.

The sheathing 24 of plastic material is draped over the frame members 12 and passes between top discs 16 and 16' to which the upper ends 14 of the members 12 are secured. At the opposite end the members 12 are formed with forked ends 26, with each leg of the fork being drilled for the reception of bolts.

Figure 4:
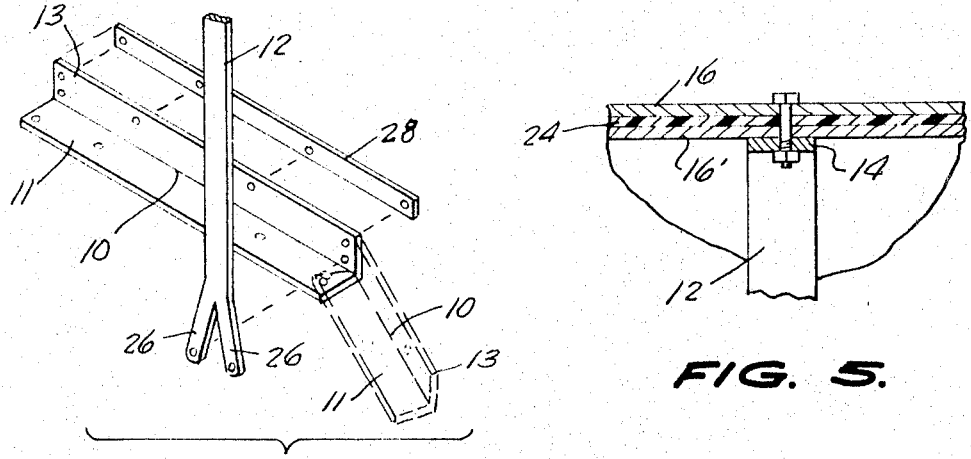
FIGURE 4 is a detailed exploded view illustrating the vertical members as secured to the base plate.
Figure 5:
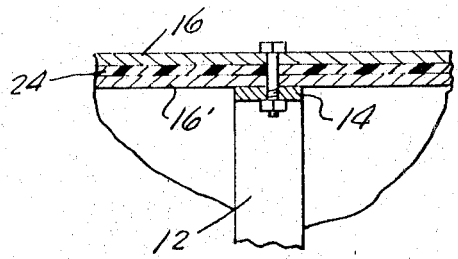
FIGURE 5 is a section on the line 5—5 of FIGURE 3.

As best shown in FIGURE 4, each of the base members 10 is a simple length of angle iron having a horizontal flange 11 and a vertical flange 13. Both flanges are perforated at intervals along their length. For assembly, the members 10 are placed generally in the angular relationship shown in FIGURE 2 in such manner that at the meeting place of two adjacent members 10, the flange 11 of one overlies the flange 11 of the other so as to bring into registery the perforations in the two flanges nearest each end. These may then be bolted or otherwise secured together, or they may be secured merely by placing through the superimposed perforations a long pin or other anchoring member to secure the framework to the ground.

The members 12 are then placed on the base plates 10 in such manner that one fork 26 overlies and registers not only with the perforation in the vertical flange 13 of one member 10 but also the vertical flange 13 of the adjacent member 10 and the legs are secured by bolts. The plastic cover 24 is placed over the frame and its bottom edge is held between the vertical flanges 13 and flat strips 28 by bolting through reigstering perforations in the strips 28 and flanges 13. The discs 16 and 16', which preferably are of light plywood, are then bolted so as to clamp the inner margins of the plastic cover 24 between the discs 16 and 16'.

In windy country, it may be well to apply a strap 30 (see FIGURE 1) extending from one side of the door frame 22 to the other. When this is used, it may be well to form one end of a strap 30 from rubber so that adjustment to a snug fit may be made by tension.

Figure 3:
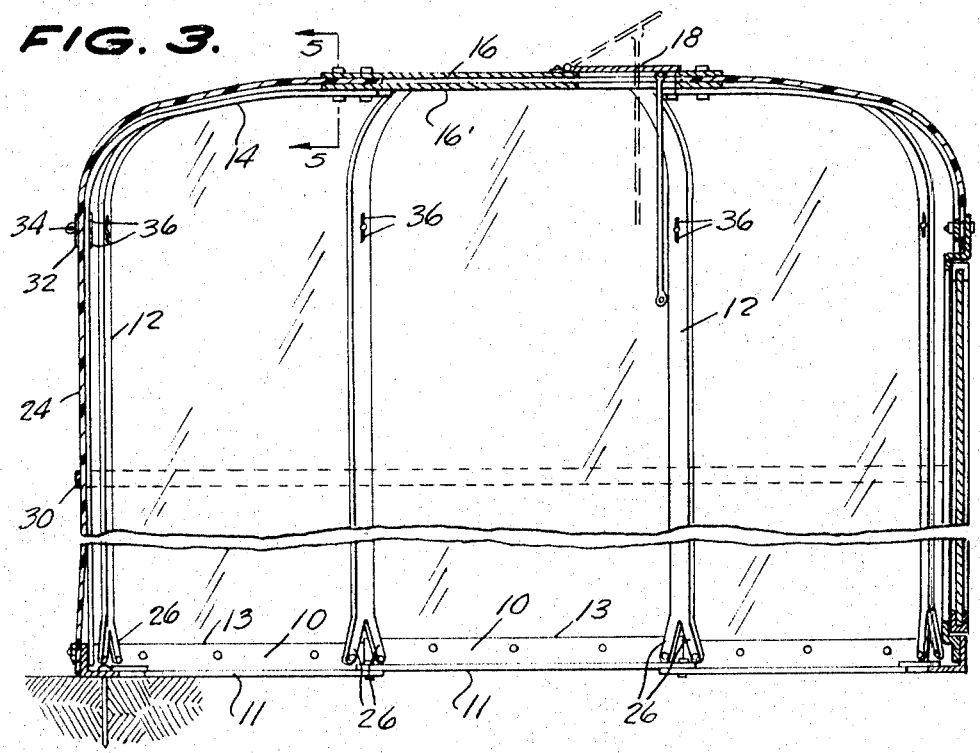
FIGURE 3 is a section on the line 3—3 of FIGURE 1.

If wind is still a problem, even with the application of the strap 30, additional securing means may be provided which is best shown in FIGURE 3. In this form, a rubber washer 32 is pierced by a cotter pin 34 and is brought to bear against the plastic 24 by piercing a hole formed in each of the uprights 12. The legs 36 of the cotter pin are then spread and flattened out against the inner surface of the member 12, making for an additional point of securement at each member 12.

In many climates, a clear or translucent plastic web will opearte like the well known "hot cap" and store sufficient heat within the greenhouse to maintain good germination and growing temperatures even when the outside temperature is quite low. If, however, it is desired to supplement the sun's heat with artificial heating means, vent 18 makes it entirely possible to vent the combustion products without contaminating the atmosphere inside the greenhouse.

It is to be noted that flat or angle stock of conventional form is used for all of the structural members. Such material is available at minimum cost and requires a minimum of special fabrication in order to suit it to this particular purpose. There is thus realized one of the major objectives of this invention which is to provide a low cost structure which may be assembled by unskilled labor.

What is claimed is:

1. In a building: a plurality of L-shaped vertical members each having on its lower end means providing two separate angularly related anchorage portions; a plurality of angle bars each having a flange to contact the ground and a vertical flange, said bars being polygonally arranged with one corner of each bar overlapping the intersecting flange of the adjacent bar and said overlapping flanges being secured together in the area of overlap, one of said L-shaped members being placed at each intersection of said bars. Each of the anchorage portions being secured to the vertical flange of a corresponding one of said intersecting bars, and a disc joining the upper ends of said L-shaped members to define a dome-shaped frame.

2. A building as set forth in claim 1, including a sheath of flexible material lying externally of said L-shaped members, the bottom portion of said sheath being clamped to said vertical flanges by lengths of strap stock secured to said flanges with the material of said sheath therebetween.

3. A building as set forth in claim 2, in which the top portion of said sheath is clamped between said disc and an additional disc.

References Cited
UNITED STATES PATENTS

| | | | |
|---|---|---|---|
| 1,065,237 | 6/1913 | Graham | 52—63 |
| 1,383,166 | 6/1921 | Steinkraus | 52—248 X |
| 2,690,185 | 9/1954 | Pomykala | 135—3 |
| 3,161,990 | 12/1964 | Morris | 52—199 X |
| 3,169,543 | 2/1965 | McGerty | 135—3 X |
| 3,333,376 | 8/1967 | Marsters | 52—90 X |
| 3,368,575 | 2/1968 | Besonen | 135—7.1 X |

HENRY C. SUTHERLAND, *Primary Examiner.*

P. C. FAW, JR., *Assistant Examiner.*

U.S. Cl. X.R.

52—90, 248; 135—3